US011585296B1

(12) United States Patent
Fluhler

(10) Patent No.: US 11,585,296 B1
(45) Date of Patent: Feb. 21, 2023

(54) SELF COMPENSATING ROCKET ENGINE ENHANCEMENT

(71) Applicant: Herbert U. Fluhler, Huntsville, AL (US)

(72) Inventor: Herbert U. Fluhler, Huntsville, AL (US)

( * ) Notice: Subject to any disclaimer, the term of this patent is extended or adjusted under 35 U.S.C. 154(b) by 0 days.

(21) Appl. No.: 17/149,674

(22) Filed: Jan. 14, 2021

Related U.S. Application Data

(60) Provisional application No. 62/960,702, filed on Jan. 14, 2020.

(51) Int. Cl.
*F02K 9/97* (2006.01)

(52) U.S. Cl.
CPC ........ *F02K 9/974* (2013.01); *F05D 2260/201* (2013.01); *F05D 2260/22141* (2013.01); *F05D 2260/605* (2013.01)

(58) Field of Classification Search
CPC ..... F02K 9/80; F02K 9/90; F02K 9/97; F02K 9/974; F02K 9/978
See application file for complete search history.

(56) References Cited

U.S. PATENT DOCUMENTS

| | | | | |
|---|---|---|---|---|
| 3,237,402 A * | 3/1966 | Steverding | ............... | F02K 9/978 102/351 |
| 3,253,403 A * | 5/1966 | Hayes | ..................... | F02K 9/974 417/DIG. 1 |
| 3,489,373 A * | 1/1970 | Parilla | ...................... | F02K 9/97 102/377 |
| 3,925,982 A * | 12/1975 | Mueller | .................... | F02K 9/82 239/265.17 |
| 4,384,454 A * | 5/1983 | Engl | ....................... | F02K 9/978 60/245 |
| 4,821,962 A * | 4/1989 | Venables | ................... | F02K 9/97 239/265.19 |
| 5,490,629 A * | 2/1996 | Bonniot | ................... | F02K 9/978 239/265.19 |
| 5,779,151 A * | 7/1998 | Sutton | ..................... | F42B 10/66 239/265.15 |
| 7,406,821 B2 * | 8/2008 | Hervio | .................... | F02K 9/978 60/770 |

* cited by examiner

*Primary Examiner* — Todd E Manahan
*Assistant Examiner* — Kyle Robert Thomas
(74) *Attorney, Agent, or Firm* — Patent Grove LLC; Tomas Friend

(57) ABSTRACT

An annular ablative gas blocking device provides for automatic altitude compensation of a rocket engine exhaust plume. The nozzle is over expanded at low level launch altitudes and near optimally expanded at the highest altitude at the terminal burnout or staging altitude of the rocket engine. The ablative gas blocking device in the nozzle exit mitigates low altitude launch effects of an over expanded nozzle and inhibits external atmospheric air entrance into the nozzle at launch. The gas blocking means ablatively erodes away from plume impingement as the rocket ascends in a pre-programmed manner to achieve optimum area expansion ratio at all altitudes.

14 Claims, 9 Drawing Sheets

SELF COMPENSATING ROCKET ENGINE ENHANCEMENT

CROSS REFERENCE TO RELATED APPLICATIONS

This application is a nonprovisional of U.S. 62/960,702 filed Jan. 14, 2020, which is incorporated herein by reference in its entirety.

STATEMENT REGARDING FEDERALLY FUNDED DEVELOPMENT

This invention was not made with any Federal or State government support.

FIELD OF THE INVENTION

The field of this invention relates to rocket engines and methods for altitude compensation for rocket engines.

BACKGROUND OF THE INVENTION

One limitation common to all types of rockets is referred to as "altitude compensation". Altitude compensation refers to means for compensating the rocket engine for the deleterious effects of operating at an altitude different from the altitude for which the rocket was designed to operate. As a rocket engine powers a payload from ground into space, it must transit all altitudes, from lower altitude to space, and thus altitude degradation has been and continues to be a bane to all rocket engine designs, robbing them from achieving their ultimate potential performance.

Altitude degradation results from atmospheric effects on the rocket nozzle exhaust and negatively impacts thrust and total impulse performance. As the effluent passes through the throat of the rocket engine, its velocity accelerates to sonic speed, producing what is referred to as "choked flow." The effluent then accelerates to supersonic speed as it transits past the throat and down the nozzle due to the nozzle's progressively increasing area at each progressive down stream axial station. As the area becomes larger, the effluent expands to fill additional nozzle area, which in turn increases the axial speed of the effluent while decreasing the local pressure in the effluent at that axial station. This process continues until the end of the nozzle, resulting in a final nozzle exit pressure (Pe). Ideally, Pe=0 but this would require an infinitely long nozzle. Consequently, the nozzle is made as long as possible within other constraints such as size, weight and stability. Additionally, nozzle length is often constrained by other factors related to the altitude compensation.

The majority of a rocket engine's thrust comes from the raw rapid momentum change imparted to the exhaust gas propellant, and Newton's law which states for every action there is an equal and opposite reaction. A smaller but still significant amount of thrust comes from Pe and its differential with the surrounding atmosphere pressure (Pa), at least at lower altitudes. In space with zero atmospheric pressure, the additive thrust is approximated by the integral of nozzle exit area times the local exit pressure Pe across the nozzle exit. However, if the rocket is at a lower altitude, the local atmosphere presses downward against the top of the nozzle shell, while the exit effluent pressure presses upwards against the inside of the nozzle shell. At lower altitude then, highest thrust and best performance is achieved approximately when the nozzle exit pressure is about the same as the local atmospheric pressure, about 15 PSI, as then there is no net static pressure force applied to the nozzle, no pressure driven extraneous flows occur, and the highest possible momentum transfer to the exhaust has been achieved.

A related atmospheric effect occurs when a nozzle is notably larger versus notably smaller than the size of the exhaust plume. The larger the nozzle, the lower the Pe and, in fact, Pe can be lower than local atmospheric pressure at lower altitudes. When this happens, the nozzle is said to be over expanded for the given atmospheric pressure because a shorter and less expanded nozzle would have provided a closer match between Pe and Pa. Similarly, if Pe is greater than Pa, the nozzle is said to be under expanded because a larger nozzle would have provided a closer match between Pe and Pa. If Pe=Pa, then the nozzle is said to be optimally expanded. When a nozzle is optimally expanded with the rocket engine providing near maximum thrust and maximum impulse performance at the altitude where Pe=Pa. Consequently, it is desirably to design a rocket engine to run as close to optimally expanded conditions for as much of a launch as possible.

A difficulty in designing a rocket engine is that Pa decreases as altitude increases and a rocket engine nozzle is optimally expanded only at the altitude corresponding to the pressure for which it is designed. Consequently, the rocket engine produces optimal performance at only one specific altitude and suboptimal performance over the majority of its ascent into space. Since most rockets spend most of their ascent trajectory and associated burn time in the upper atmosphere, most ground launched rocket engines employ a slightly over expanded design at lower altitude operation so that they will be operating at a more optimum expanded configuration while transiting the higher altitudes where they spend more time.

When a rocket engine is over expanded at lower altitude, Pe<Pa and the atmosphere presses the effluent together into a narrower column under and inside the nozzle so that the effluent stream is narrower than the exit diameter of the nozzle. This leads to a relative vacuum just inside of the edge of the nozzle exit and inward flow around the perimeter of an annulus inside of the exit aperture of the nozzle exit. A net atmospheric pressure pressing down over this annulus area with no compensating upward force results in a direct thrust loss at launch when the most thrust is needed. Furthermore, the lower pressure can cause separation of the effluent flow from the nozzle wall upstream on the inside near the nozzle exit, leading to potentially significant irregular flows, oscillations, and instabilities in the effluent flow which can cause stochastic and sporadic side thrusts making rocket control difficult. The resultant instabilities can be large enough to damage the rocket engine. Over expansion is less of a problem at high altitudes because Pe and Pa are both lower. However, both over expansion and under expansion lead to wasted potential impulse performance at high altitudes.

An ideal nozzle, called a De Laval nozzle, optimally converts propellant exhaust flow into higher axial velocity effluent which increases thrust over that achieved without such a nozzle. The nozzle does this by partially constraining the exhaust gas in an isentropic manner so that only molecules which are in line with the rocket axis are free to flow in that direction, whereas molecules traveling perpendicular to the axis are reflected from the nozzle wall back into the plume so as to return their energy to the plume. In other words, the nozzle acts as a rectifier, or alternatively a converter, of randomly oriented thermal motion in the exhaust, into a preferred axial direction. By this means, the exhaust thermal energy is converted into axial velocity, and the more energy is thusly converted, the higher the axial velocity.

U.S. Pat. No. 6,591,603 describes an expansion-deflection engine, which employs a design similar to a Pintle injector. A central deflector can be articulated to enable more or less flow along the inner wall of the bell, thereby modulating the terminal exit pressure and allowing it to be adjusted to match local atmospheric pressure for near ideal compensation at the edges which prevents atmospheric inrush and its associated instabilities. The inner core of the plume may operate at lower pressures, but it is shrouded by the high velocity shell of the plume effluent which effectively shields it from any inrush of air. Any pressure lower than atmospheric pressure inside the axial core of the plume, however, subtracts from the net achievable thrust. Disadvantages of the expansion-deflection engine include the need to cool the deflector, which is in the middle of the hottest part of the plume. The deflection of hot gases also increases the cooling requirements for the engine nozzle liner aft of the throat, which adds cost and weight.

US 20040231316 A1 describes a shell annulus of additional nozzle shell liner provided in a forward stowed position during launch to provide a moderately over expanded or optimally expanded nozzle for lower altitude operation. The additional nozzle shell liner is mechanically lowered into a position below the exit of the launch nozzle when the altitude pressure dictates, thereby creating an extended nozzle with the larger area expansion ratio desired to operate ideally at higher altitude. This solution is not continuously varying versus altitude but provides two discrete altitude tuned nozzles.

U.S. Pat. Nos. 4,434,614 and 4,901,525 describe one or more concentric inner inserts secured internal to a high altitude, over expanded nozzle with an upper attachment point near where flow separation would occur for the design-to lower altitude. During launch, the inner most internal insert defines a moderately over expanded or optimally expanded nozzle used for the first phase of flight. Upon reaching a higher altitude where altitude degradation becomes undesirable, the inner internal insert is jettisoned, leaving the over expanded nozzle suitable for high altitude operation. This solution provides two discrete altitude tuned nozzles. Multiple nested internal liners can be employed to more accurately compensate for each altitude, but adds considerable complexity, weight, and cost.

US 2007/0012820 A1 describes an expanded nozzle below a ridge to create a first nozzle section up to ridge which is either optimally or only moderately over expanded to support lower altitude operation, followed by a larger more over expanded second nozzle, which provides a larger over expansion to support efficient high altitude operation. This solution is not continuously varying versus altitude, and experiences reduced thrust degradation at launch as with any other over expanded launch engine.

Another method of addressing the altitude compensation problem is described in U.S. Pat. Nos. 5,619,851 and 5,683,033 wherein a high altitude, ground level geometrically over expanded nozzle is provided with vents about the nozzle to allow air to ingress and equalize the pressure internal to the nozzle with the external atmosphere during lower altitude ground launch. As the rocket ascends, the vents are progressively closed as a function of altitude to compensate for altitude. Venting inefficiencies, however, would limit net performance versus an ideal variable altitude compensating nozzle.

A further method of addressing the altitude compensation problem is proposed in U.S. Pat. No. 6,568,171 B2, wherein a gas or rapidly evaporable fluid is injected about a circumferential ring located at an axial station between the throat and the nozzle exit. This injection of the gas or fluid is located near where the flow separation might otherwise occur and fills in the void otherwise created between the plume and nozzle inside wall below the flow separation point.

In view of the foregoing, a need remains in the art for a rocket engine nozzle that automatically compensates for changes in ambient pressure as a rocket gains altitude and thereby provide higher total thrust at launch and higher total impulse and ISP compared to existing altitude compensating engines and nozzles.

BRIEF SUMMARY OF THE INVENTION

The present invention seeks to address the problem of altitude compensation in a simple, low cost and elegant manner. By the present invention, a highly overextended nozzle is made to operate efficiently at launch and to provide altitude compensated performance at all points between launch and an objective highest altitude of operation. The invention involves a maximally expanded nozzle for the design-to highest altitude of operation and a gas blocking device or means that enables this highly over expanded nozzle to operate safely and optimally at lower altitude.

An ablative blocking means effectively modifies the high altitude nozzle to be optimally expanded at lower altitude. The ablative blocking means is designed to erode at a prescribed rate and manner so, as the ever expanding plume impinges onto it, the ablative blocking means/device erodes in a predictable manner to provide for nozzle expansion compensation versus altitude.

A light weight filler material may be used to provide volume close out of the blocking means. Additionally or alternatively, thin baffle and shell configurations may be used. A gas blocking device may be retrofitted to an existing rocket nozzle. Additionally, a rocket engine may be made to comprise a rocket nozzle with a gas blocking means integral with the nozzle or attached thereto.

BRIEF DESCRIPTION OF THE DRAWINGS

The elements of the drawings are not necessarily to scale relative to each other, usually in order to enhance clarity, with emphasis placed instead upon clearly illustrating the principles of the disclosure. Like reference numerals designate corresponding parts throughout the several views of the drawings in which.

DETAILED DESCRIPTION OF THE INVENTION

Figure 1:
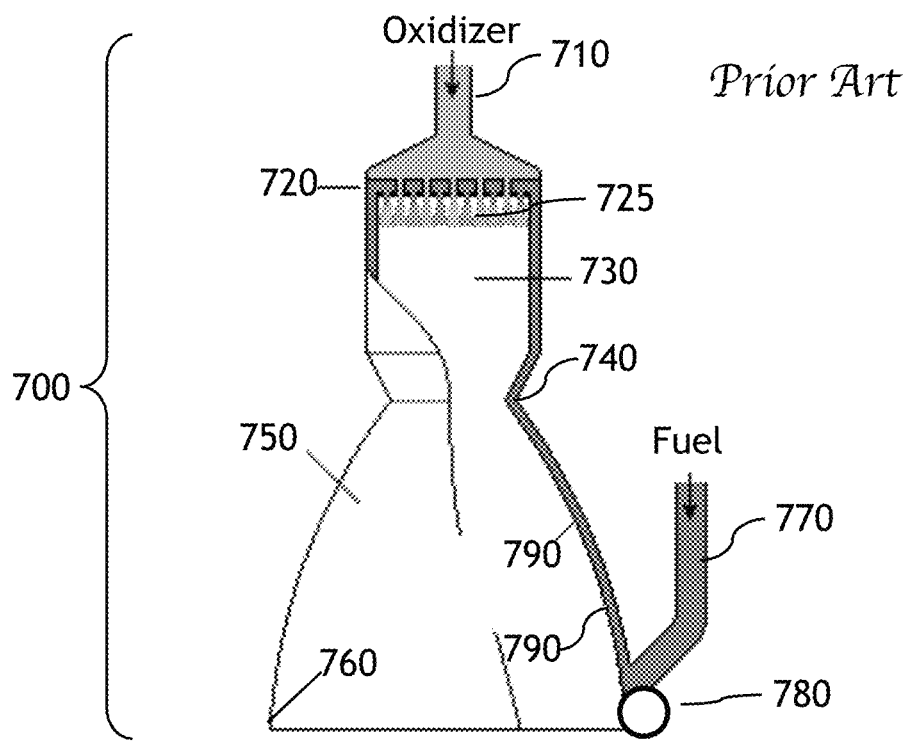
FIG. 1 is an outside view and section cut through view through the axis of a prior art rocket engine.

FIG. 1 shows the primary components of a conventional De Level "bell" axisymmetric liquid rocket engine 700 comprising an injection head 720, a combustion chamber 730, a nozzle 750 that sometimes is defined to include the throat 740 and a "Bell" down to the nozzle exit or lip at 760. Nozzle 750 is typically selected to be overextended when the rocket is used to launch the vehicle from a lower altitude to a higher altitude so that the nozzle 750 will be more optimally expanded at the higher altitude.

Additionally, there is at least one propellant input 710 which will be either fed into the injector head 720 directly or via an alternate input 770 into the coolant manifold 780 that feeds the coolant plenum used to cool the engine from the fierce heat generated in the combustion chamber 730, the heat caused by the exothermic reaction of the propellant therein, or by other heat input such from a nuclear reactor. If the propellant is a bi-propellant, then the oxidizer is usually input near the top of the engine into the injector head 720, and the fuel is input 770 into the coolant manifold 780 to be distributed evenly into the coolant plenum 790 before finally flowing into the injector head 720 to be then injected with the oxidizer via a fine atomized spray 725 into the combustion chamber 730 and burnt to produce heat for the engine to operate and produce thrust. Variations on this core design may include different thermodynamic cycles, variations on the plumbing and flow direction and even reversals of the roles of fuel and oxidizer.

Figure 2:
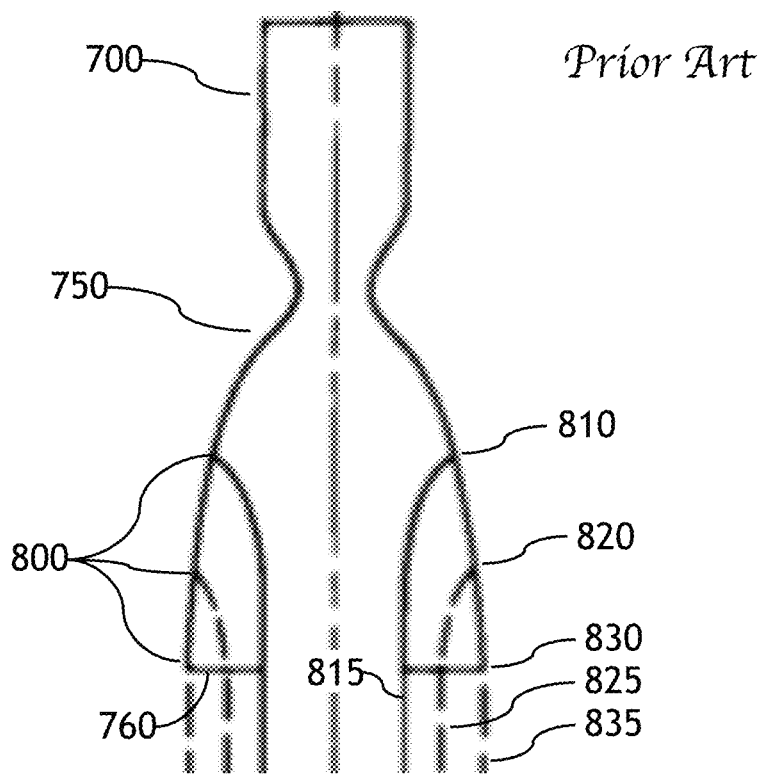
FIG. 2 is a cross sectional view of a prior art rocket engine with a high altitude large area expansion ratio showing axial locations of flow separation at different altitudes.

FIG. 2 illustrates the effluent and plume configuration for a rocket engine 700 with an over expanded nozzle 750 when operating at lower altitude, and near optimally expanded at higher altitudes. For each altitude there is a different flow separation axial location 800 along the inside wall of nozzle 750. Flow separation location 810 is most forward axially inside the nozzle and corresponds to operation at lower altitude. Flow separation location 820 is further towards the exit and corresponds to operation at mid altitude. Flow separation location 830 is located at the nozzle exit lip and corresponds to operation at the maximum altitude for which the nozzle is designed to operate. Effluent plume boundaries 815, 825, and 835 correspond to each of the altitude conditions for 810, 820 and 830. As this nozzle is designed to operate optimally at the highest altitude, flow separation point 830 with plume boundary 835 corresponding to the diameter of the nozzle exit 760 represents the optimum situation at the highest altitude. In one aspect, the invention effectively modifies the nozzle 750 of FIG. 2 to accommodate lower altitude operation, while gradually transitioning into the same configuration of when the highest altitude is achieved.

Figure 3:
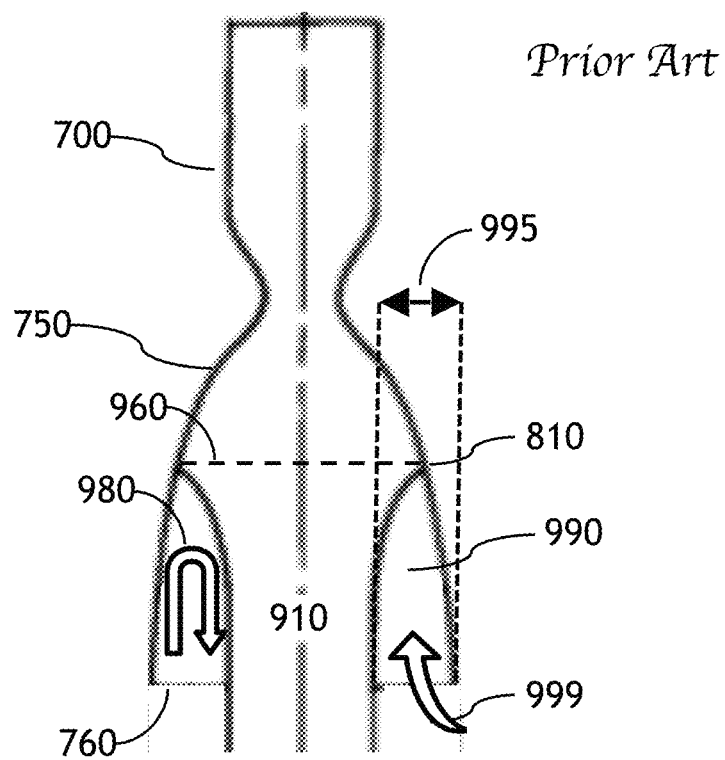
FIG. 3 illustrates the inrush of outside air into a rocket engine nozzle of high altitude large area expansion ratio when launched at sea or ground level and how it sets up undesirable circulations inside the nozzle periphery and concomitantly reduces thrust through internal nozzle vacuum.

FIG. 3 illustrates the operation of over expanded nozzle 750 when operating at launch altitude. Dashed line 960 represents the axial location where flow separation 810 occurs inside nozzle 750 when operating at lower altitude, and where nozzle exit 760 needs to be moved to for optimum operation at lower altitude. Were the nozzle exit move to 910, then the engine would be operating optimally since flow separation would be occurring at the nozzle exit. Flow separation ring 960 approximately demarks the pressure isobar for atmospheric pressure, so axial stations above (towards the combustion chamber) of 960 manifest higher static pressures than the external atmospheric pressure and axial stations below 960 manifest lower static pressures than external atmospheric pressure. This results in a net vacuum in the torus annulus 990 about the plume 910 which sucks in outside atmospheric air 999 into the torus annulus 990. The flow resulting from the inrush of air 999 depends on the engine geometry and operating parameters but the flow generally takes on a coaxial rotational flow about the torus 980. This rotational flow may orbit or spiral within the annulus and can disrupt the flow separation point, causing further perturbations of the flow. It can also oscillate axially, first ingressing upwards and then egressing downwards in potentially violent oscillations that can perturb the plume 910, causing off axis divert forces which must be recognized and compensated for by the guidance and control system. If allowed to become extreme, these oscillations result in instabilities which can destroy the engine.

FIG. 3 also illustrates how thrust loss occurs in an over expanded rocket engine launched at lower altitude. The void 990 has an annular thickness 995 which occupies a substantial fraction of the entire nozzle radius, and a larger fraction of the plume 910 radius. In a worst case the void 990 contains an almost zero pressure and the outer atmosphere has a pressure of about 15 PSI. Thence as can be seen, there would be 15 PSI of downward pressure acting on an annular ring of thickness 995 which is not countered by any upward pressure, resulting in a net loss of thrust. Since the axially projected area of the annulus void is fairly large, the thrust loss can be considerable even though the pressure of 15 PSI is small compared to other pressures in the rocket engine.

Figure 4:
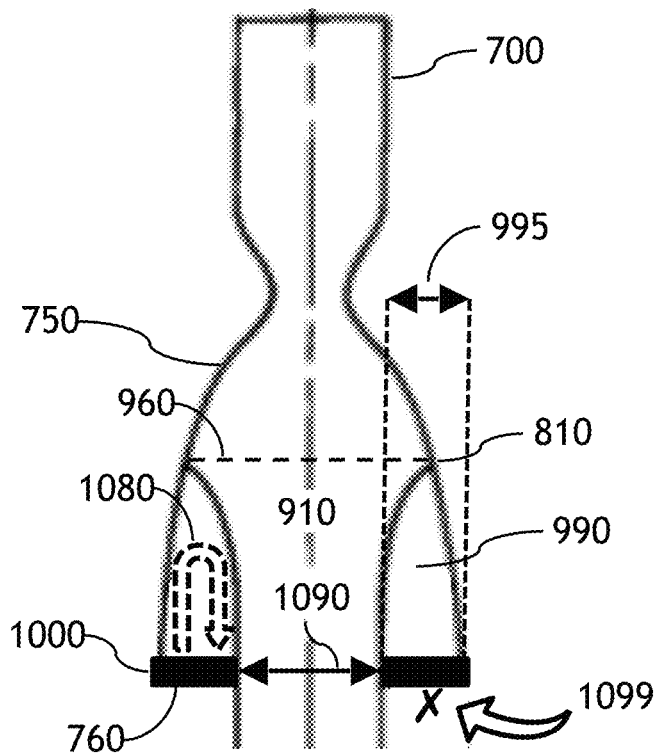
FIG. 4 is a side cross section view of a rocket nozzle comprising a disk annulus gas blocking means that prevents inrush of atmospheric air into a nozzle.

FIG. 4 is a cross sectional view of one embodiment of a rocket nozzle comprising a gas blocking device 1000. In this embodiment, the gas blocking means or gas blocking device 1000 has the shape of a substantially flat disk annulus. The gas blocking device 1000 is comprised of a reasonably fire proof material and may optionally be pierced perpendicular to is flat surface with a plurality of open aperture holes (not shown) that are located and sized to meter a specific amount of outside atmospheric air into or out of the nozzle. The number, size and locations of the open apertures may be selected by detailed fluid dynamics modeling to achieve a desired method of operation to achieve the objectives.

The gas blocking device 1000 is positioned at, on, or near the nozzle exit, 760 and closes out the nozzle 750 with the exception of leaving a central circular aperture 1090 sufficient for the plume 910 to pass through and the nozzle 760. The gas blocking device 1000 blocks atmospheric air 1099 from entering the nozzle. This enables atmospheric pressure to build up on the bottom side of flat gas blocking device 1000, countering the downward air pressure across to top side of the nozzle across the void thickness 995 resulting in substantially complete recovery of the previously lost thrust. Additionally, the gas blocking device reduces circulation 1080 inside of the void 990, as well as the pressure. Both of these reductions reduce the opportunity for producing instabilities which might destabilize or cause oscillations the plume 910 and damage the engine. The plume diameter will increase and the flow separation point 810 will move aft towards the exit 760 as the engine burns so that the plume impinges directly on the inner edge of central circular aperture 1090, which will cause some of the plume effluent to divert into the void 990 thereby raising its pressure. As the engine burns, the flow separation point will move to the nozzle exit at 760 and the gas blocking device 1000 will gradually be ablated by the plume 910 until the central circular aperture 1090 has the same radius as the nozzle exit 760 (i.e., a completely open) with the flow separation point having moved to 810. Therefore, there is some radius of the central circular aperture 1090, and correspondingly smaller width 995 of disk annulus which provides a plume width equal to the radius of the central circular aperture 1090 and also provides a flow separation point between 810 and 830, identified by 825 in FIG. 5A.

Figure 5A:
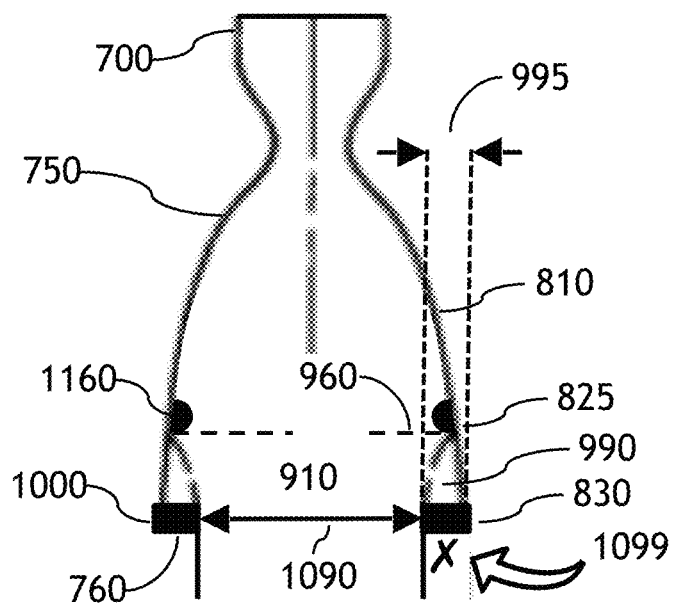
FIG. 5A is a side cross section view of a rocket nozzle comprising a disk annulus gas blocking means with a reduced width and a ridge or edge ring about an inner surface of the nozzle.

Since the gas blocking device 1000 width 995 is smaller in FIG. 5A than in FIG. 4, there is less nozzle area subjected to static pressure imbalance, meaning both that there is a smaller void 990 and there is a larger plume 910 diameter 1090. This means that more thrust is produced because there is more expansion from the larger nozzle diameter before the flow separation point 825, providing higher effluent speeds, which result in higher momentum transfer to the exhaust.

Optionally, a flow separation inducing, internally disposed ridge or edge 1160 may initiate and hold the flow separation point/ring 825 at a precise desired axial location. This enforces a specific point for the flow separation to occur until substantially higher altitude is achieved which ensures concomitant operation with the gas blocking disk annulus. The degree to which the flow is held at 1160 is determined by the radial extent of the ridge intrusion into the nozzle. A more intrusive ridge tends to hold the flow separation point/ring over a larger variation of altitude pressures, and a less intrusive ridge holds the flow separation point/ring for only a short period of time and corresponding small variation in altitude. Ridge or edge 1160 may be implemented independently of other elements of this invention or it can be integrated to enforce the flow separation fixation for any gas blocking means.

Figure 5B:
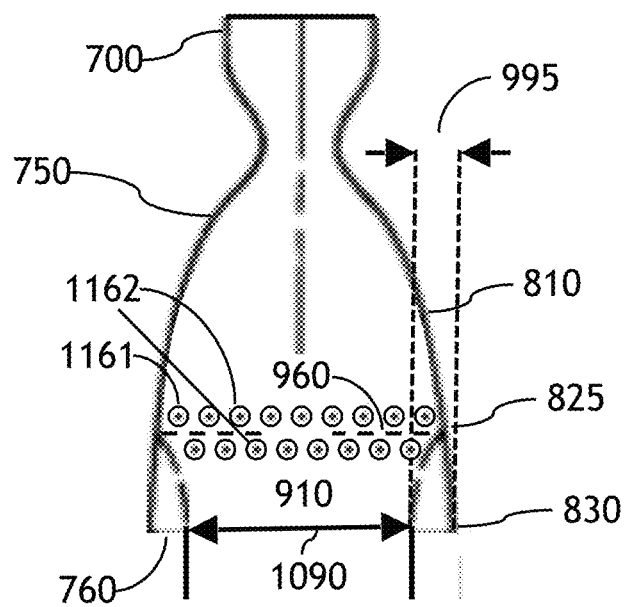
FIGS. 5B and 5C are side cross section views of a rocket nozzle comprising one or more rings of bumps arrayed in a band about the flow separation point/ring.

Ridge or edge 1160 may be replaced with a plurality of inwardly direct raised bumps or edge segments 1161 shown in FIG. 5B, either with or without the gas blocking means 1000, arranged in an annular band about the inner surface of the nozzle and having an axial width of the band to cause flow separation to occur over a more extended operating range of pressures and altitudes. This arrangement defocuses the pressure and altitude operating regime for holding flow separation localization so the flow separation point/ring is more amiable to migrating its position continuously as the pressure and altitude change. It likewise enables the flow separation point/ring to migrate smoothly towards the nozzle exit edge as the ring annulus erodes away over time. The raised bumps or edge segments 1161 may be used without a gas blocking device to help control and manage flow separation in any rocket engine or any device involving flow separation. The raised bumps or edge segments 1161 may be arranged in a regular array but are preferably arranged in an offset array as illustrated in 1162 or a random or pseudo random array to prevent any particular modality from setting up in the flow separation.

Figure 5C:
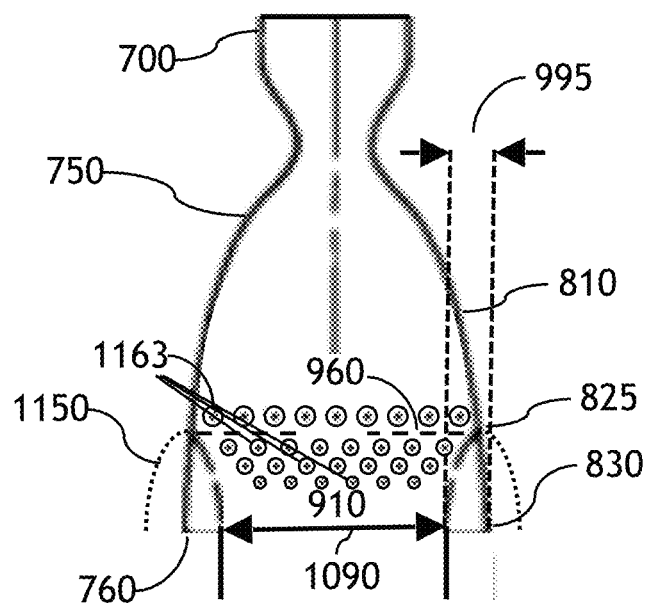

The raised bumps array 1162 may also be tapered in both their height, their width and their density as a function of axial station and may be integrated with other attributes of the engine to achieve improved net stability and performance by managing the flow separation point/ring 960. FIG. 5C illustrates an exemplary embodiment wherein raised bumps array 1163 are tapered in their diameter and their height both towards smaller bumps as a function of lower axial station, and increasing density with lower axial station. This type of arrangement serves to hold the flow separation at near 825 at lower altitudes, and then allows it to move smoothly to lower axial stations with higher altitude until it finally resides at the nozzle exit lip 760 commensurate with the nozzle operating as a near optimally expanded nozzle at highest altitude of operation.

FIG. 5C illustrates how the raised ridge 1160, raised bump 1161 or raised bumps array 1162 may be simultaneously integrated with a further expansion of the nozzle 1150 below them. This further expansion may embody an over expanded nozzle at low altitude which is optimally expanded at high altitude, or it can employ a custom nozzle profile that transitions gradually from an optimally expanded nozzle at low altitude (under expanded nozzle at high altitude) at axial station 825 to an optimally expanded nozzle at high altitude (over expanded nozzle at low altitude) at 830 with the raised ridge or edge 1160, raised bumps 1161 or raised bumps array 1162 or raised ridge segments array 1163 serving to stabilize and attach the flow separation to progressively lower axial stations during flight ascent.

Figure 6:
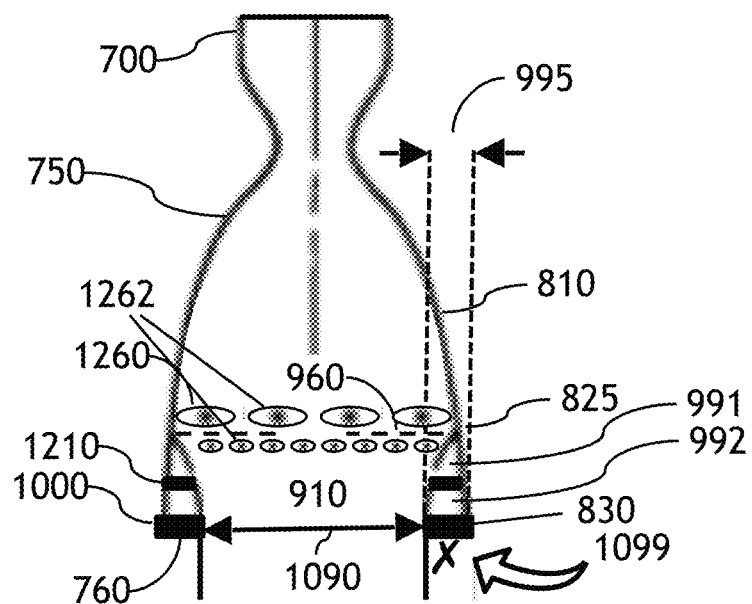
FIG. 6 is a side cross section view of a nozzle comprising disk annuli and ridge or edge segments in a band about the flow separation point/ring.

In another embodiment, at least one additional, or second, gas blocking device 1210 substantially similar to 1000, but of narrower width, may be added to the rocket nozzle between a first gas blocking device 1000 and the flow separation point 825 as illustrated in FIG. 6. This additional gas blocking device 1210 will break up circulation in the void 990 into two subordinate voids 991 and 992, which inhibit the circulation modes that existed in void 990 prior to the addition of 1210. As the height of any and all subordinate voids 991 and 992 becomes small compared to their width 995, axially aligned circulations are suppressed along with attendant undesired instabilities. Annular flows are still possible but will be reduced due to inhibited coupling in the axial direction. The second gas blocking device 1210 may also function as, and in lieu of, flow separation inducing internally disposed ridges 1160 or flow separation inducing internally disposed ridge 1160 can be integrated with the fixation for optional disk annuli 1210.

The gas blocking device 1000 can be added to or retrofitted to any over expanded nozzle and does not require needing to be built into it at the outset. This provides an additional degree of freedom for the rocket mission planner in selecting a best available rocket engine to achieve mission objectives. Essentially, a cheaper existing rocket engine may be retro-fitted with gas blocking device 1000 and/or 1210 with this arrangement providing superior high altitude performance when the gas blocking device 1000 and/or 1210 ablates away to reveal the underlying over expanded nozzle.

The gas blocking device 1000, 1210 may be made from a material chosen to ablate and erode away over time when exposed to the exhaust plume 910, but not overtly erode from indirect exposure to the radiated heat from the plume nor heat of local gas flow within the void 990, both of which are expected to impart less heating than direct contact with the plume proper. The material is preferably selected so that it will erode away preferentially at a high rate where and when the plume 910 impinges on the inner edge of the center circular aperture 1090. Therefore, as the rocket rises in altitude, the atmospheric pressure will reduce, the plume 910 will increase in diameter in response to the lower pressure at the higher altitude, and the diameter of the center circular aperture 1090 will erode away approximating the larger size of the plume 910 diameter at the higher altitude due to the larger impingement of the larger plume 910 on the inner edge of the center circular aperture 1090. In this way, the rocket engine becomes variably self altitude compensating by enlarging the center circular aperture 1090 by the precise size needed. At the end of the engine burn and/or staging, the gas blocking device(s) 1000, 1210 have eroded away substantially completely, leaving only the lower altitude highly over expanded nozzle, which by design is optimally expanded for the burn out or staging altitude.

FIG. 6 shows an embodiment in which ridge or edge 1160 or bumps 1161 or bumps array 1162 or 1163 are alternatively embodied as an annularly disposed set of ridge or edge segments 1260 or a ridge segment array 1262 that serve the same functions but employ selectable ridge segment lengths associated with selectable gap distances between the segments to enable additional degrees of freedom to capture and retain the flow separation point/ring at a desired axial station for each exterior altitude pressure condition.

Figure 7B:
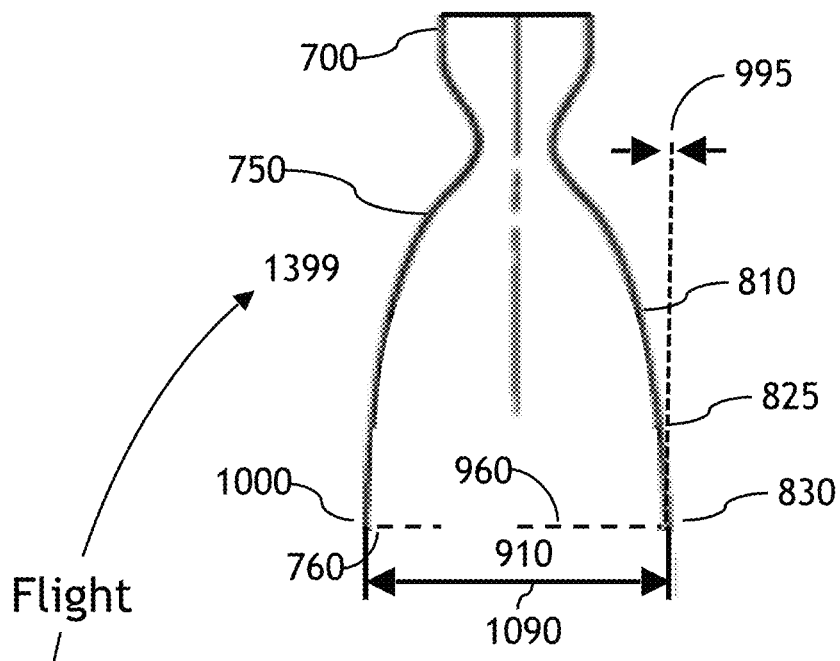
FIGS. 7A and 7B illustrates the ablation of a disk annulus gas blocking means at launch and at highest altitude.
Figure 7A:
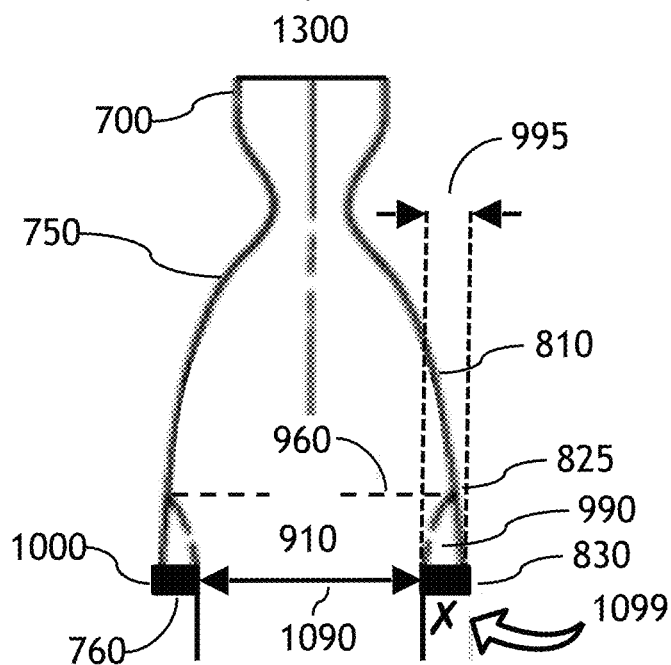

FIGS. 7A and B illustrate the erosion or ablation of gas blocking device 1000 as the engine burns. FIG. 7A shows the engine at lower altitude launch 1300 for an embodiment corresponding to FIG. 5A. The center circular aperture 1090 erodes where it is impinged on by a progressively enlarging plume 910 diameter, until end of flight (for that stage, FIG. 7B) at or near burn out or staging 1399 at maximum altitude, the gas blocking device 1000 has been eroded completely away, leaving only the core nozzle which by design is optimally expanded for that maximum altitude at 1399. The rate of erosion/ablation is selected to provide a near optimally expanded nozzle at every altitude between launch 1300 and maximum altitude 1399. In this way a close approximation to a continuously variable, ideally expanded rocket engine 200 providing near ideal maximum thrust and net total impulse during the entire ascent may be achieved.

An issue that may arise in the use of disk annulus 1000 (and/or 1210) is the potential for high forces during startup of the engine. Startup of a rocket engine can entail a series of small explosions until the engine if fully running. Such small explosions could stress the disk annulus 1000, either damaging it, damaging its mounts or in severe cases ripping it from the nozzle either partially or entirely. Ideally disk annulus 1000 is fabricated strong enough to survive this environment but, if this cannot be achieved within the constraints of the design or program, it may be advantageous to add a "burping" means to the disk annulus 1000 (and/or 1210), effectively allowing it to burp the high pressure from the small explosions without damage until the engine is fully running, and to then return to its normal operations position.

Figure 8A:
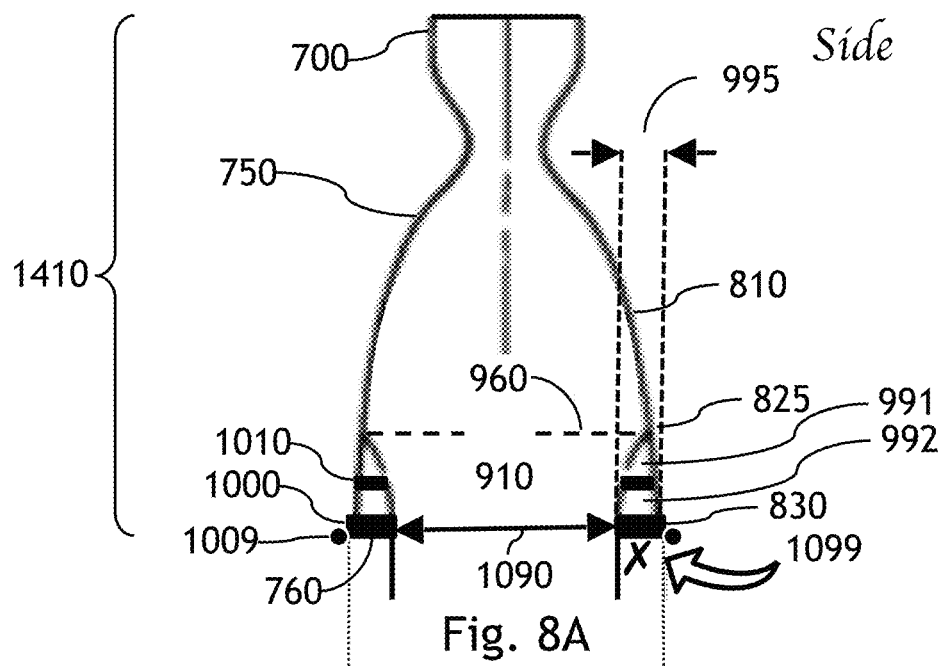
FIGS. 8A, 8B, and 8C show side, bottom, and burped views of an embodiment of a gas blocking device comprising tension hinged annular segments.
Figure 8B:
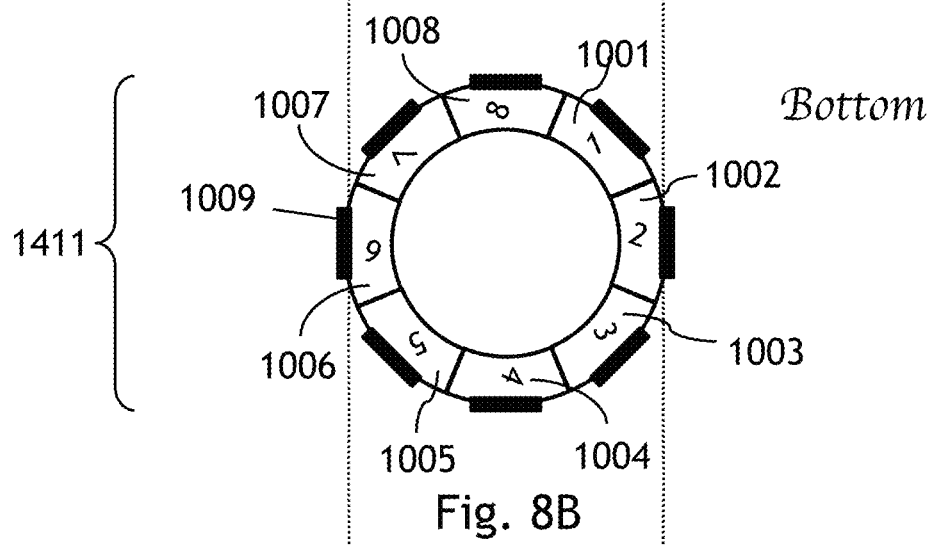
Figure 8C:
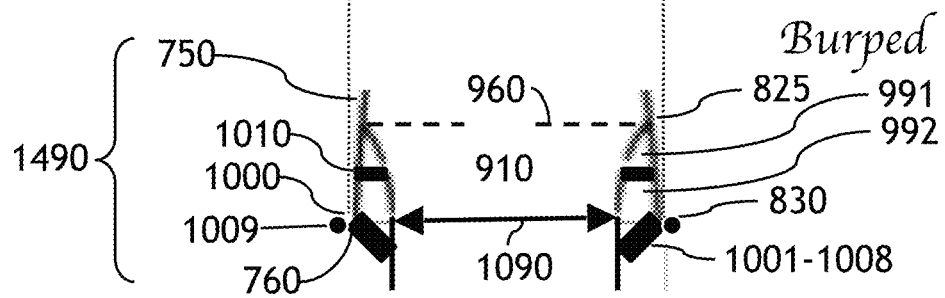

One approach to achieving this burping means is illustrated in FIGS. 8A, 8B, and 8C. Rather than constructing the gas blocking device 1000 as one solid annulus piece, the gas blocking device 1000 may comprise a plurality of annular sections, or flaps. FIG. 8B shows 8 annular sections 1001-1008, each mounted about the circumference of the nozzle exit 760 using its own rotationally tensioned flexible (e.g. spring) hinge 1009. Flexible hinges 1009 allow their respective attached annular sections 1001-1008 to pivot outwards from the plane of the nozzle exit 760, thereby effectively removing them from the path of exhaust effluent if and when the pressure inside the engine nozzle 750 becomes too high, such as during an engine startup small explosion. The tension in flexible hinges 1009 then returns the annular sections 1001-1008 to their natural positions, nominally co-planar with the plane of the nozzle exit 760 when the high pressure has passed. Although only shown for the bottom most gas blocking device 1000, such attachment may additionally or alternatively be applied to any additional gas blocking device 1210 employed.

Side view 1410 shows the gas blocking device disk annulus and its subordinate annular sections in the default stowed position prior to engine start up. Bottom view 1411 is a looking into the nozzle of the engine under the same/similar conditions as view 1410, showing the individual (here eight total) annular sections 1001-1008 of the disk annulus 1000 and each annular section's attendant flexible hinge 1009 mounting it to the perimeter of the nozzle exit edge 760. Burped view 1490 shows the engine exit area during a "burp" event, with the subordinate annular sections of the disk annulus pivoted about their flexible tensioned hinges 1009 and extended downwards to relieve the excess pressure experienced inside the nozzle 750 because of a startup (or other) small explosion or other over pressure condition.

Although eight annular sections are illustrated in FIG. 8B, the number of such sections could be more or less in number to suite a best mechanical design and other requirements of the system. In the limit, the ring annulus might not need be segmentation at all, might be left whole, and secured to the nozzle with just one tensioned hinge 1009 thereby acting like a singular flap.

Figure 9A:
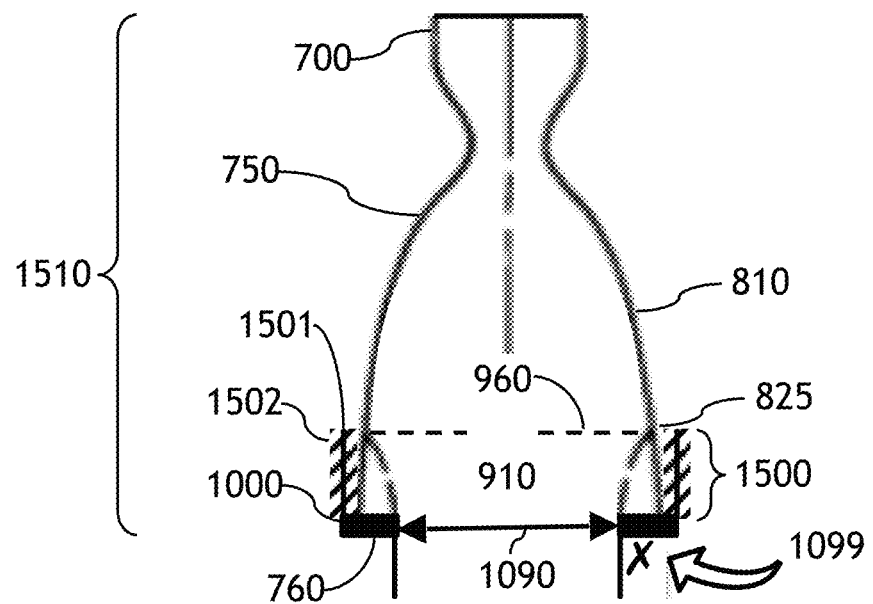
FIGS. 9A and 9B shows three views of an embodiment of a gas blocking device comprising a plurality of coil spring retained sliding rod mounts enabling the device to be pressured away from the nozzle edge to release any transient high pressure gases.

Instead of sectioning the gas blocking device 1000 into a plurality of annular sections, the disk annulus may be left whole, and then held tightly to the bottom of the nozzle exit 760 by a plurality of tensioned extendable fasteners 1500 between the disk annulus and the end of the nozzle 760 as illustrated in FIGS. 9A and B. These tensioned extendable fasteners may comprise vertical rods with sleeved coil springs, or circumferential leaf springs or other mechanical means allowing the disk annulus to move from the disk annulus and release a momentary pulse of pressure, and then return. Such means may be active devices under computer or mechanical control.

Figure 9B:
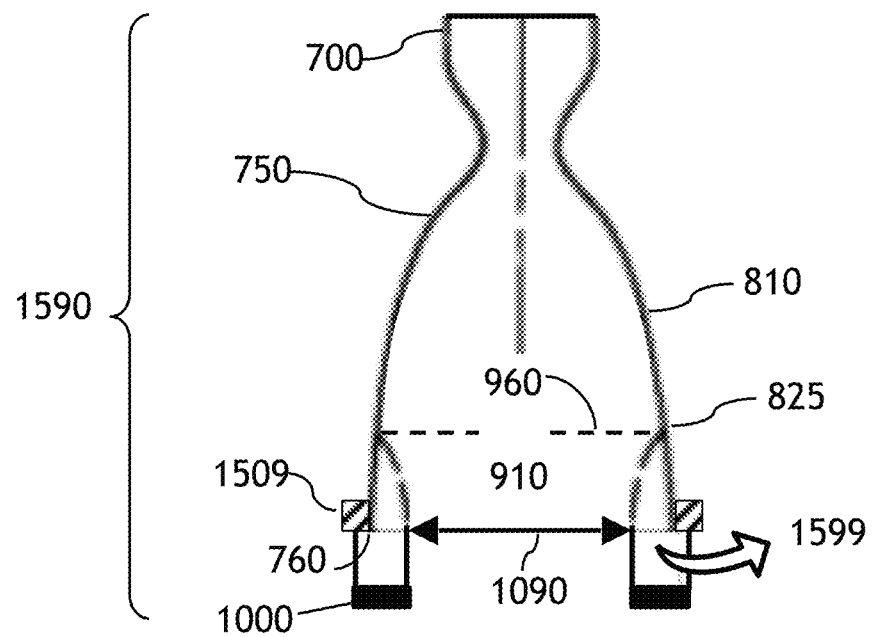

FIG. 9A shows vertical rods 1501 with sleeved coil springs 1502 prior to engine start up or during flight after all high pressure transients have subsided 1510, wherein atmospheric air 1099 cannot enter the nozzle. Upon experiencing a high pressure transient at 1590 (FIG. 9B), the high pressure presses downward on the gas blocking device 1000 to translate it downward to the open position shown which compresses the coil springs 1509 to resist the pressure, but in translating downwards it vents the transient high pressure 1599 to the atmosphere. Once the pressure has reduced, the compressed coil springs 1509 retract the disk annulus 1000 back to its typical position as illustrated at 1510.

Figure 10:
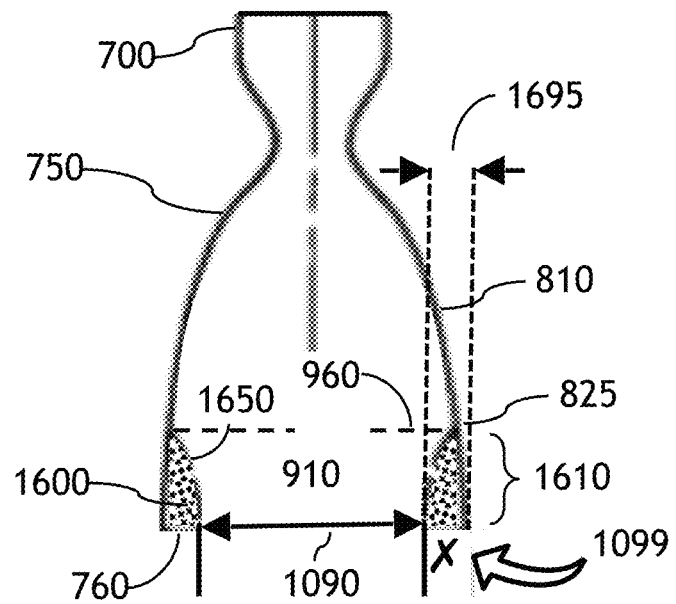
FIG. 10 is a side cross section view of a nozzle comprising a torus-like annular gas blocking means which contours to the nozzle curvilinear profile as well as the plume profile so as to fill in the void between the two.

The embodiment of a nozzle comprising a gas blocking device shown in FIG. 10 provides a three-dimensional solid body of revolution, shaped as an asymmetric toroid gas blocking means 1600 with a radial thickest 1695 substantially the same as the disk annulus thickness 995, but having an axial height extent 1610 commensurate with the distance between the flow separation point 825 and the nozzle exit 760. The toroidal gas blocking means 1600 may comprise a solid, an enclosed shell, optionally with vent holes, or a simple one faced shell along the surface 1650.

The toroidal gas blocking means 1600 is secured to the inner nozzle via attachment points along the perimeter of the nozzle exit 760 and optionally as well as along a circumference near or coincident with the flow separation ring 825. This may be done by piercing the nozzle with fasteners and/or a nozzle section joint may be positioned at this axial station to facilitate mechanical fastening. The toroidal gas blocking means 1600 fills in the void 930 with material that substantially displaces the air therein and extends the nozzle inner surface along the plume outer profile to the exit of the rocket engine.

The toroidal gas blocking means 1600 serves to displace air from the volume previously occupied by void 930 which, without any compensating means, would admit air at high atmospheric pressure into the void which in turn would compress plume 910 and create flow separation point 810 at a far forward location in the engine leading to instability problems and issues already described. The toroidal gas blocking means 1600 serves to remove this high pressure and to inhibit any low pressure in the volume.

Figure 11:
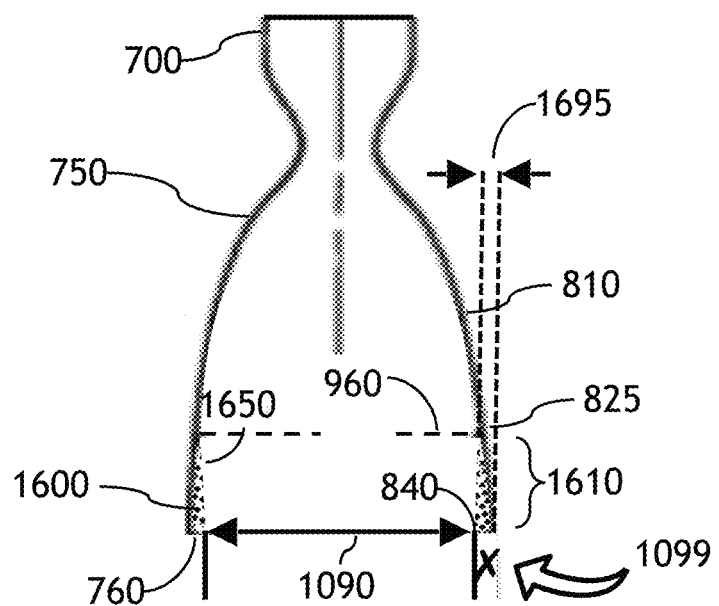
FIG. 11 is a side cross section view of a nozzle comprising a torus-like annular gas blocking means.

The ideal plume shape and preferred shape of surface 1650 may resemble a substantially straight cylindrical inner wall as shown in FIG. 11. Such a shape results in a thinner toroidal gas blocking means 1600 and serves to translate the flow separation point from axial station 810 to 825 to the nozzle exit plane at 840. The specific profile (other than substantially straight cylindrical) of the inner surface may be determined through detailed fluid dynamics simulations.

Both low and high altitude optimum performance is achieved by allowing for a planned ablating of the toroidal gas blocking means 1600 away from the inside as the rocket ascends. Gas blocking means 1000, 1210, 1600 are constructed such that their ablation occurs in a manner that specifically and precisely enlarges the plume exit diameter 1090 to effect the desired variable altitude compensation along the flight to achieve near optimum altitude compensation performance.

One method for making a gas blocking device 1000, 1210, 1600 to implement a desired ablation profile involves a sequential wound spiral wrapping of different materials with known ablation parameters starting from the inside of the shape and building to the outside with each selected material used for at least one wrap. Each material is selected to provide a prescribed rate of ablation that, in composite, provides the ablation profile needed to achieve a desired near optimum altitude compensation. The wraps of ablative material may vary with their ablation rate, such that each wrap of material about a mandrel can have a different ablation rate. For example, the inward facing wraps may be selected to have a higher resistance to ablation so as to weather the initial launch with little ablation, with progressively more periphery wraps made of more easily ablated material to ablate away more quickly to accommodate the likely more quickly reducing atmospheric pressure during launch.

Figure 12:
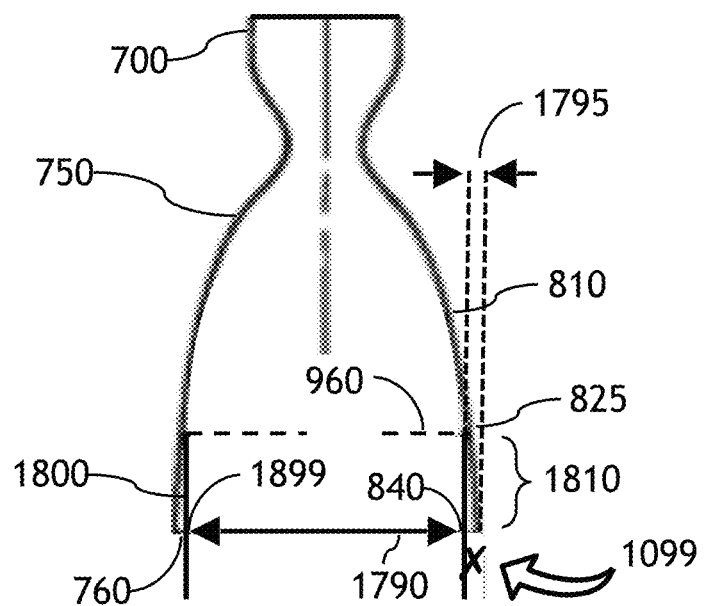
FIG. 12 is a side cross section view of a nozzle comprising a cylindrical shell annular gas blocking means shape.

FIG. 12 illustrates an embodiment of the invention resembling FIG. 11 in form and function, wherein a substantially cylindrical shell 1800 of length 1810 takes the place of toroidal shape. The shell 1800 is affixed to the nozzle at or near the flow separation point/ring 825 at low altitude launch and is designed to erode progressively from the bottom 1899 up towards 825, progressively opening up more nozzle exit aperture with altitude. This may also be instantiated with an arrangement of layers of progressively different widths so as to expose more ablative wraps at the bottom nearest the nozzle exit so as to ablate there first. As may be required to mitigate circulations and oscillations, shell 1800 may also be closed out with a disk annulus 1000 to mitigate these and related undesirably phenomenon. Numerous ablative materials suitable for aerospace use have been developed and characterized for their ablation properties including organic resins, flexible ablative polymers, Phenolic Impregnated Carbon Ablator (PICA), Silicone Impregnated Reusable Ceramic Ablator (SIRCA), carbon, carbon composites, ceramics, cork, balsa wood, plywood, and composites of laminated materials.

The toroidal gas blocking devices may comprise a reasonably fire and heat resistant but ablative solid or foam, or a solid or foam wrapped in a protective liner, a combination of filler and structural elements (such as reinforcement fibers and/or straps and lines) or some combination of the above. Many ablative materials exist from which the toroidal gas blocking means may be fabricated, including wood and reinforced balsa wood made to ablate at the correct rate to provide the objective variable area ratio nozzle needed versus altitude during its climb.

Figure 13:
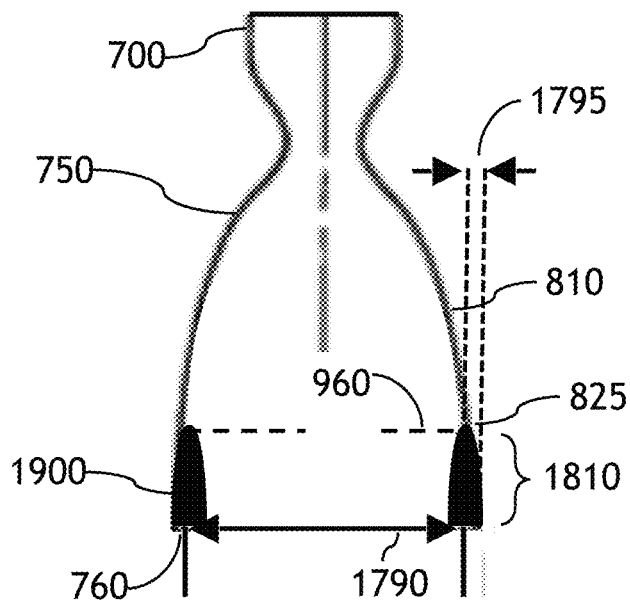
FIG. 13 is a side cross section view of a nozzle comprising vertical oriented fins aligned radially and disposed internal to and around the nozzle exit circumference.

FIG. 13 illustrates an embodiment of the invention wherein vertically oriented and radially aligned fins 1900 are mounted internal to the nozzle inner wall. These serve to suppress azimuthal flows and ensure all flows are vertically aligned, which helps to suppress instabilities within the nozzle. The fins can be used by themselves or may be integrated with other features of the invention to stabilize the flow in the nozzle.

One embodiment of a method for retrofitting an existing rocket engine to comprise a gas blocking device involves positioning the gas blocking device inside the nozzle and attaching the gas blocking device to the nozzle by attachment means. Attachment means may include one or more of ridges, nuts, bolts, screws, adhesive, and welding The gas blocking means may comprise ridged brackets for attaching the blocking means to the end or near the end of the rocket nozzle bell. The attachment means may comprise flexure and/or articulation means to accommodate rapid pressure fluctuations inside the nozzle. Examples of flexing and/or articulation means may include spring restrained hinges connecting annular panels of the gas blocking device to the edge of the nozzle or in apposition to the edge of the nozzle. Additionally or alternatively, attachment means may comprise damping means for inhibiting oscillatory motion such as damping rods, shock absorbers, rubber, elastic plastic, metal springs, or torsion devices. The attachment are preferably positioned on the outer periphery of the gas blocking device to prevent damage caused by the rocket plume.

Normally, a gas blocking device 1000, 1600 is positioned and mounted to, or very near, the terminal lip of the rocket nozzle bell exit. A second, or additional gas blocking device 1210 may be positioned and mounted to the nozzle at some distance upstream of the nozzle bell exit.

The invention claimed is:

1. A rocket nozzle configured for automatic altitude adjustment of an exhaust plume passing through the nozzle, said nozzle comprising:
    a nozzle inlet configured to receive combustion products from a combustion chamber;
    a nozzle bell;
    a nozzle outlet having an outlet perimeter; and a gas blocking device;
wherein:
the nozzle outlet is over expanded for operation at low altitude;
the gas blocking device is annularly disposed inside the nozzle bell so as to reduce the outlet perimeter of the nozzle; and
the gas blocking device comprises an ablative material which, when the exhaust plume passes over the gas blocking device, ablates in a pre-programmed erosion profile over time and thereby expands the outlet perimeter of the nozzle;
wherein the gas blocking device comprises at least one of:
means to relieve transient high pressures in the nozzle during a rocket engine startup and
limited flow venting holes between an inside nozzle volume and an external atmosphere.

2. The rocket nozzle of claim 1, wherein the erosion profile over time is designed to provide a theoretical optimum perimeter for an ascending rocket.

3. The rocket nozzle of claim 1, wherein the gas blocking device extends axially from a flow separation point to a trailing edge of the nozzle outlet.

4. The rocket nozzle of claim 1, wherein:
the gas blocking device comprises a plurality of disk annuli disposed along an inner wall of the nozzle;
the plurality of disk annuli are distributed axially by approximately equal spacings between a flow separation ring inside the nozzle and the perimeter of the nozzle outlet; and
in combination, the plurality of disk annuli form an aperture sized for the exhaust plume to exit the nozzle.

5. The rocket nozzle of claim 1, wherein said gas blocking device is a toroidal annulus of solid, shell, or surface construction.

6. The rocket nozzle of claim 1, wherein the gas blocking device is of a solid construction, an empty shell construction, a shell with filler construction, or a surface/sheet construction.

7. The rocket nozzle of claim 1, wherein the gas blocking device comprises layered wraps of ablative material.

8. The rocket nozzle of claim 1, further comprising at least one axially disposed radially and internally protruding ring ridge on a nozzle inner surface to enforce flow separation to occur.

9. The rocket nozzle of claim 1, comprising an array of inwardly direct raised bumps on an inner surface of the nozzle, said inwardly direct raised bumps arranged within an axial width of an annular band.

10. The rocket nozzle of claim 1, comprising axially aligned fins inside said nozzle near the nozzle outlet to inhibit annular flow.

11. The rocket nozzle of claim 1, wherein the gas blocking device comprises of one or more of: cork, balsa wood, plywood, a carbon graphite composite material, a composite material, and a composite of laminated materials.

12. The rocket nozzle of claim 1, comprising at least one of: a flow separation attachment point control means; an internally projecting ridge ring; an internally projecting edge ring; an internally projecting ring; an array of ridge or edge circumferential segments; an internally projecting ring; and an array of symmetric or asymmetric bumps.

13. The rocket nozzle of claim 1, comprising a flow separation attachment point control means and wherein controlling flow separation comprises a tapering of a height, a width, a length, a spacing and a density of said flow separation attachment control means versus axial station from a low altitude flow separation ring to a high altitude flow separation ring.

14. The rocket nozzle of claim 1, wherein said gas blocking device comprises at least one fin axially aligned, radially oriented, and disposed between a flow separation ring and an end of the nozzle and further disposed azimuthally about the inner surface of the nozzle to mitigate azimuthal gas flows, oscillations and instabilities within the nozzle.

* * * * *